March 14, 1961 E. D. CLICKNER 2,974,534
FISHING REEL AND GEARING
Filed Nov. 27, 1957 3 Sheets-Sheet 1
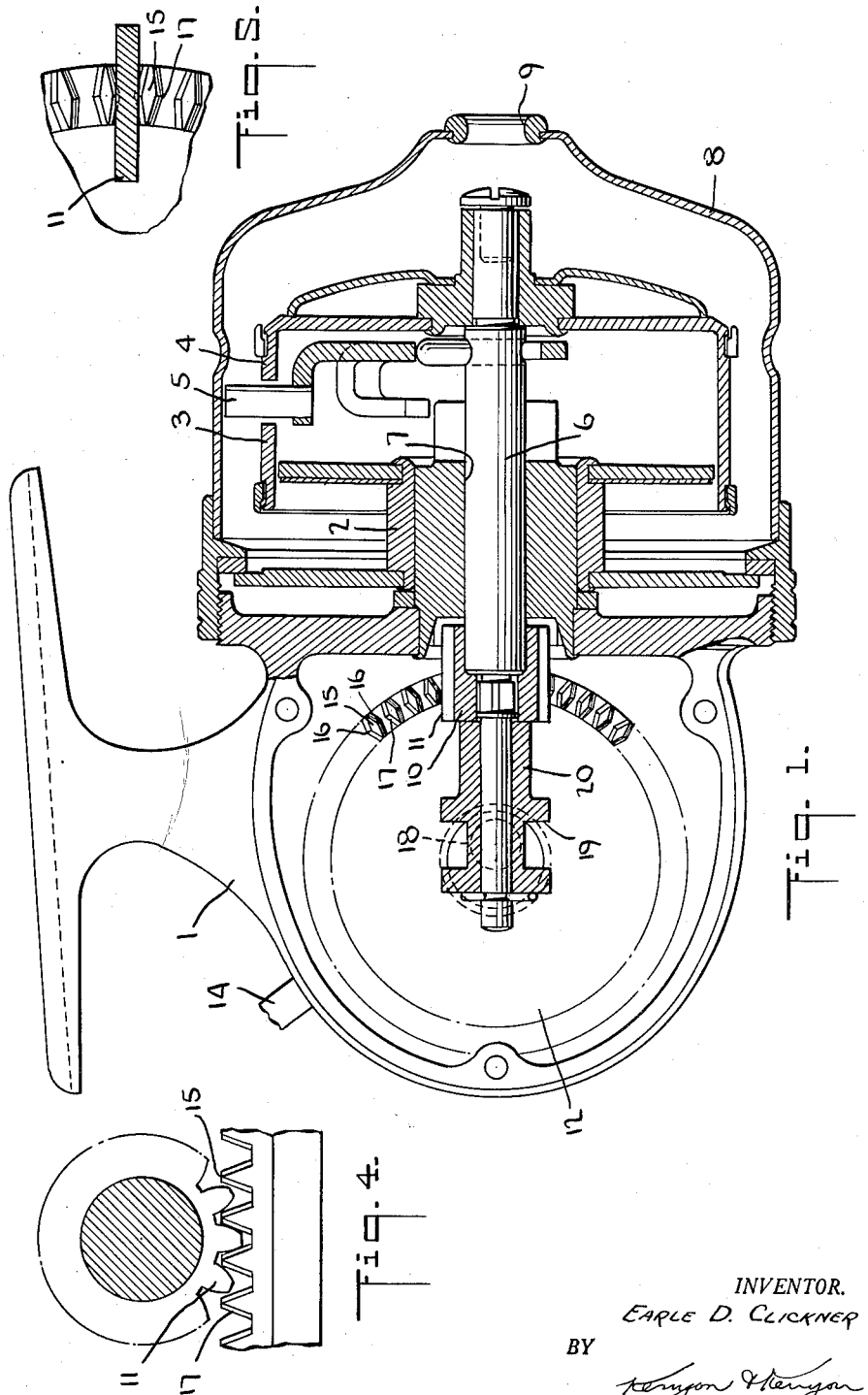
INVENTOR.
EARLE D. CLICKNER
BY
Kenyon & Kenyon
ATTORNEYS

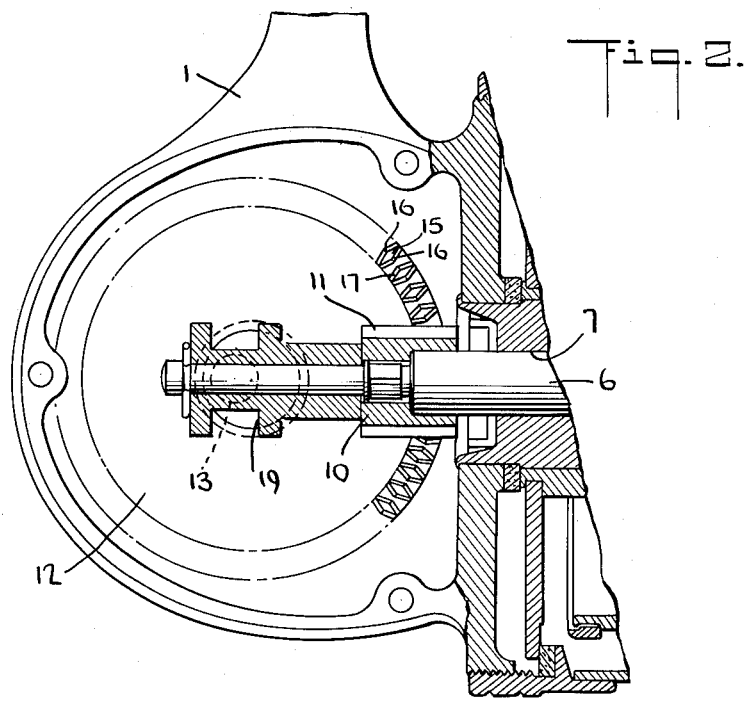

March 14, 1961 E. D. CLICKNER 2,974,534
FISHING REEL AND GEARING
Filed Nov. 27, 1957 3 Sheets-Sheet 3

INVENTOR.
EARLE D. CLICKNER
BY
ATTORNEYS

United States Patent Office 2,974,534
Patented Mar. 14, 1961

2,974,534

FISHING REEL AND GEARING

Earle D. Clickner, Kalamazoo, Mich., assignor to Shakespeare Company, Kalamazoo, Mich., a corporation of Michigan Filed Nov. 27, 1957, Ser. No. 699,241

5 Claims. (Cl. 74—22)

This invention relates to fishing reels and gearing which is particularly adapted for use in fishing reels or similar devices where light weight, inexpensive right angle drives are employed and particularly to fishing reels of the fixed spool or spinning type.

In such fishing reels there is provided a fixed spool and the line is taken off over the end of the spool and is rewound on the spool with a spooling member which is disposed coaxially with the fixed spool and which moves about the spool laying the line thereon. As the line is retrieved in such spools, many times reciprocation of the spooling member is brought about in order to level wind the line. Heretofore, the drive on such reels has usually been accomplished with bevel gears which are relatively expensive to make and which must be mounted and centered with considerable accuracy in order to assure smooth, even, running and in cases where level wind has been desired, separate means have been required to cause reciprocation of the spooling member axially of the spool.

One of the objects of the present invention is to provide a fishing reel in which the drive of the spooling member consists of new, inexpensive and easily made gears which can be effectively mounted and positioned with less care than would be required with bevel gears.

Another object is to provide such a reel having a level wind mechanism in which the right angle gearing is such that there may be reciprocation between the gears during the drive.

Another object of the invention is to provide a right angle gear drive consisting of a common spur gear or pinion combined with a novel crown gear having teeth of novel configuration which can be easily produced at low cost and in which there may be a reciprocation between the gears during rotation.

Another object of the invention is to provide a novel method of producing such a crown gear.

Other objects and advantages of the invention will appear from the following specification in which for the purpose of illustrating the invention there is shown a preferred form of the invention which gives desirable and satisfactory results but which it will be understood is merely illustrative of the invention which can be modified from the preferred form shown in order to attain the ends of the invention.

In the drawings:

Fig. 1 is a sectional view through a reel embodying the invention;

Fig. 2 is a partial sectional view of the reel shown in Fig. 1, but with the operating parts in a different position;

Fig. 3 is a partial sectional view of another reel embodying the invention;

Fig. 4 is a detailed view showing the intermeshing of the pinion and crown gear;

Fig. 5 is a view in section showing a top plan view of the intermeshing of the pinion and crown gear;

Figure 6:
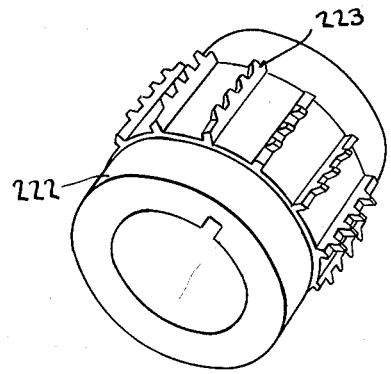
Fig. 6 is a view of a milling hob utilized in cutting the crown and gear.

The invention consists generally in a fishing reel having a fixed spool and having a spooling member which is adapted to fit concentrically about the spool for rotation and reciprocation, for spooling and level winding the line on the spool. There are means for supporting and actuating the spooling member consisting of a shaft which is fixed to said spooling member and which is mounted in a bearing which is disposed axially of the spool. The shaft is rotatable and reciprocable in this bearing. A spur gear is fixed on said shaft for engagement with a crown gear which is mounted for rotation on a driving shaft which is disposed perpendicularly of the first shaft. A hand crank is supplied for rotation of this shaft.

The crown gear has a plurality of peripherally disposed teeth, each of which is generally diamond shaped in plan. One diagonal extends radially of the gear and the other circumferentially and the vertices at the end of the circumferentially extending diagonals all lie in a common circle concentric with the axis of the crown gear and form line contact tooth faces. Because of the diamond shape, with the surfaces diverging away from the line contact faces, clearance is provided on both sides of the circle in which the contact faces lie so that the crown gear may drive the spur gear when it is rotating.

In order to provide for level winding, means are provided for reciprocating the shaft which carries the spooling member. These, in the preferred form of the invention, consist of a crank which engages a circumferential groove in a member mounted on the reciprocating shaft. The crank is driven by the shaft which drives the crown gear and the pinion is of sufficient length to maintain engagement with the crown gear for the entire reciprocation of the shaft which carries the spooling member.

The reel shown in Figs. 1 and 2 is a typical spinning or fixed spool reel having a frame 1 and a fixed spool 2 and a spooling member 3, which in this case consists of a cylindrical shell 4 which is mounted coaxially with the fixed spool and is adapted to fit over the spool as shown in Fig. 1. A line pickup member 5 is provided which is actuated in a manner which forms no part of this invention to either project as shown in Fig. 1 for spooling the line or to be retracted during the casting operation.

The spooling member 3 is fixed on a shaft 6 which is mounted for rotation and reciprocation in a bearing 7. By the rotation of the shaft 6, the spooling member 3 is rotated for spooling the line on the spool 2 and reciprocation of the shaft 6 reciprocates the spooling member for level winding. In the form of reel shown, a hood 8 is provided fitting over the spool and spooling mechanism and is provided with an opening 9 for the line.

Fixed on the shaft 6 with its teeth projecting radially is a pinion or spur gear 10. The teeth 11 are elongated as shown in Fig. 1 so as to remain in mesh with the teeth of the crown gear 12 during reciprocation of the shaft.

The crown gear 12 which serves to rotate the pinion 10, the shaft 6 and the spooling member 3, is mounted on a driving shaft 13, which extends at right angles to the shaft 6. A crank 14 is fixed to the shaft 13 for manually rotating the same.

The crown gear 12 has a plurality of peripherally disposed teeth 15. These teeth are generally diamond shaped in plan when viewed from the face of the gear and project from the face of the crown gear and taper slightly as is shown in the drawings. One diagonal of the diamond of each tooth extends substantially radially of the gear and the other diagonal extends generally circumferentially of the gear. The apices 16 which may be referred to as lateral apices, being those disposed at the ends of the diagonals which extend generally circumferentially of the gear, all lie in a common circle concentric with the axis of the gear 12 and form line contact tooth faces 17 which engage the teeth 11 of the spur gear.

By providing the diamond shape, clearance is provided at both sides of the circle on which the line contact tooth faces fall so that the only contact between the teeth 15 of the crown gear and the teeth 11 of the spur gear is at the line contact face 17 and there is no interference as the crown gear rotates to drive the pinion.

The shaft 6 is reciprocated by means of a crank 18 carried by the shaft 13, which engages in a circumferential groove 19 in the member 20 carrried by the shaft 6. As the shaft 13 rotates the crank member 18 which is eccentric to the axis of the shaft 13, it moves the shaft from the position shown in Fig. 1 to the position shown in Fig. 2 and on further rotation, back again to the position shown in Fig. 1, thus providing the reciprocation of the spooling member necessary for level winding. During this reciprocation, the teeth 15 of the crown gear and the teeth 11 of the spur gear remain in mesh although the spur gear is reciprocated back and forth in the operation.

The reel shown in Fig. 3 does not have the level wind feature. The pinion 110 is connected to a shaft, the end of which appears at 106 which carries a suitable spooling member similar to the member 3 shown in Fig. 1. The crown gear 112 is identical with the gear 12 shown in Figs. 1 and 2 and when rotated by the shaft 113 which is rotated by the handle 114, rotates the spooling member.

The gear shown and described is particularly desirable and useful because in assembling the reel it is not necessary to place the gear centers with the exactitude and close tolerance normally required in positioning bevel gears which would normally be employed in a drive such as this. Furthermore, the crown gear is one which can be manufactured easily and inexpensively on a milling machine and may be thus produced at at materially lower cost than would be the case with bevel gears, and the fact that it may be used with a pinion instead of a bevel mating gear is of material advantage in so far as cost is concerned. Furthermore, the construction is materially simplified because of the ability to slide the pinion in the crown gear.

Figure 7:
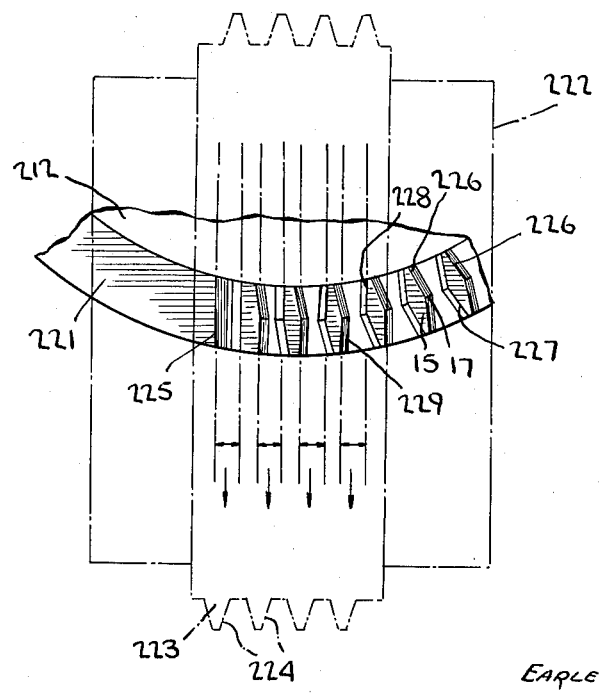
Fig. 7 is a top plan view illustrating the manner in which the teeth are cut in the crown gear.

In Figs. 6 and 7 there is shown how the crown gear can be made using a generating type gear hobbing machine. The gear blank indicated at 212 has a peripheral edge 221 from which the teeth are cut by a hobbing tool 222. This tool is provided with a plurality of cutters 223, each of which has a plurality of teeth 224.

In cutting the gear the first pass of the cutting tool cuts a groove 225, which extends parallel to but is spaced to one side of the radius of the blank. This cut in general forms one side 226 of the diamond of a tooth, while at the same time forming the side 227 of the diamond of an adjacent tooth. One of the teeth 224 passing exactly radially of the gear blank forms the exact interdental space between the line contact faces 17 and one of the cutters which passes on a line parallel to but on the other side of the radius and cuts the side 228 of one tooth and simultaneously the side 229 of the diamond of an adjacent tooth.

In actual operation the hobbing tool 222 is rotated on an axis generally parallel to the tangent to the gear blank and as it is rotated the gear blank is rotated in a counterclockwise direction as shown in Fig. 7.

The cutter members 223 each have a plurality of teeth 224 which are progressively disposed along the axis of the hobbing tool so that as the gear blank is rotated each tooth engages substantially in the slot 225 already formed in the gear blank, thus as the gear blank is rotated there is a slow transition from the slot indicated at 225 in Fig. 7 to the final gear formed with the teeth having the diamond plan and with the sides diverging from the line contact 17.

It will be appreciated by those skilled in the art that the positioning of the teeth on the hobbing tool and the rate of the rotation of the tool and the rate of turning of the gear blank are matters for careful timing, which, however, once the concept of forming the gear teeth in this manner is decided upon can be readily determined.

The invention has been described above in connection with the preferred form of the invention which works well in practice. However, it will be appreciated that the preferred forms are shown as merely illustrative of the invention and that other forms of the invention coming within the scope of the following claims are contemplated.

I claim:

1. A right angle drive including intermeshing gears comprising a crown gear having a plurality of peripherally disposed teeth, extending laterally from the face of said crown gear, each generally diamond shaped in plan as viewed from the face of said gear, having one diagonal extending substantially in a radial direction of said gear and having the other diagonal extending in a generally circumferential direction of said gear with the vertices at the ends of the circumferentially extending diagonals lying in a common circle concentric with the axis of said crown gear, each tooth having a pair of contact faces, one on each side of said tooth, each contact face comprising a line extending substantially perpendicular to the face of said gear and disposed at said common circle and comprising the line of meeting of a pair of surfaces of said tooth extending from said contact face toward the radially extending diagonal of said tooth and providing clearance on both sides of said circle for teeth of a spur gear in mesh with said teeth of said crown gear, and a spur gear disposed on an axis at right angles to the axis of said crown gear with its teeth in mesh with the teeth of said crown gear and in contact only with said contact faces of said crown gear.

2. A right angle drive including intermeshing gears comprising a crown gear having a plurality of peripherally disposed teeth extending laterally from the face of said crown gear, each generally diamond shaped in plan as viewed from the face of said gear, having one diagonal extending substantially in a radial direction of said gear and having the other diagonal extending in a generally circumferential direction of said gear with the vertices at the ends of the circumferentially extending diagonals lying in a common circle concentric with the axis of said crown gear, each tooth having a pair of contact faces, one on each side of said tooth, each contact face comprising a line extending substantially perpendicular to the face of said gear and disposed at said common circle and comprising the line of meeting of a pair of surfaces of said tooth extending from said contact face toward the radially extending diagonal of said tooth and providing clearance on both sides of said circle for teeth of a spur gear in mesh with said teeth of said crown gear, and a spur gear disposed on an axis at right angles to the axis of said crown gear with its teeth in mesh with the teeth of said crown gear and in contact only with said contact faces of said crown gear and, means for reciprocating said spur gear axially during rotation of said gears, said spur gear having a length as great as the reciprocation by said reciprocating means.

3. A right angle drive including intermeshing gears comprising a crown gear having a plurality of peripherally disposed teeth extending laterally from the face of said crown gear, each tooth having line contact faces on opposite sides thereof all of said line contact faces extending substantially perpendicular to the face of said gear and disposed at a circle concentric with the axis of said gear and, each contact line face comprising the line of meeting of substantially plane surfaces diverging from said line contact faces, thereby providing clearance at both sides of said circle for the teeth of a spur gear in mesh with the teeth of said crown gear to limit contact between the faces of the teeth of said spur gear and the teeth of said crown gear to the line contact faces, and a spur gear disposed on an axis at right angles to the axis of said crown gear with the teeth of said spur gear in mesh with the teeth of said crown gear and in contact only with said line contact faces of said crown gear.

4. A right angle drive including intermeshing gears comprising a crown gear having a plurality of peripherally disposed teeth extending laterally from the face of said crown gear, each having line contact faces on opposite sides thereof all of said line contact faces extending substantially perpendicular to the face of said gear and disposed at a circle concentric with the axis of said gear and, each contact line face comprising the line of meeting of substantially plane surfaces diverging from said line contact faces, thereby providing clearance at both sides of said circle for the teeth of a spur gear in mesh with the teeth of said crown gear to limit contact between the faces of the teeth of said spur gear and the teeth of said crown gear to the line contact faces, and a spur gear disposed on an axis at right angles to the axis of said crown gear with the teeth of said spur gear in mesh with the teeth of said crown gear and in contact only with said line contact faces of said crown gear and means for reciprocating said spur gear axially during rotation of said gears said spur gear having a length as great as the reciprocation by said reciprocating means.

5. In a fishing reel having a fixed spool and a spooling member disposed about said spool for rotation and reciprocation for spooling and level winding a line on said spool and a shaft supporting said spooling member and mounted for rotation and reciprocation, the improvement comprising means for rotating and reciprocating said shaft and spooling member comprising a crown gear mounted for rotation on an axis perpendicular to said shaft having a plurality of peripherally disposed teeth extending laterally from the face of said crown gear toward said shaft, each of said teeth having a pair of contact faces on opposite sides thereof comprising lines extending substantially perpendicular to the face of said gear and disposed at a circle concentric with the axis of said gear, each face comprising the line of meeting of a pair of surfaces of said tooth diverging from said contact face to provide clearance at both sides thereof for teeth of a spur gear in engagement with said contact faces during rotation of said crown gear and a spur gear fixed to said shaft on which said spooling member is mounted and having its teeth in mesh with the teeth of said crown gear and in contact only with said contact faces of the teeth of said crown gear and means for rotating said crown gear and for simultaneously reciprocating said shaft, said spur gear having a length as great as the reciprocation of said shaft whereby said spur gear and crown gear may maintain meshing contact throughout the reciprocation of said shaft.

References Cited in the file of this patent

UNITED STATES PATENTS

| | | |
|---|---|---|
| 618,272 | Johnson | Jan. 24, 1899 |
| 1,053,871 | Purdom | Feb. 18, 1913 |
| 1,324,287 | Williams | Dec. 9, 1919 |
| 1,820,246 | Preis | Aug. 25, 1931 |
| 2,357,153 | Wildhaber | Aug. 29, 1944 |
| 2,410,913 | Wildhaber | Nov. 12, 1946 |
| 2,745,607 | Taggart et al. | May 15, 1956 |
| 2,750,850 | Wildhaber | June 19, 1956 |
| 2,776,803 | Shakespeare | Jan. 8, 1957 |
| 2,834,559 | Nagy | May 13, 1958 |
| 2,852,205 | Beger | Sept. 16, 1958 |
| 2,869,389 | Proefke | Jan. 20, 1959 |